United States Patent [19]

May et al.

[11] 4,443,340

[45] * Apr. 17, 1984

[54] CONTROL OF IRON INDUCED FOULING IN WATER SYSTEMS

[75] Inventors: Roger C. May, Glenside; Frank C. Sessa, Wyncote, both of Pa.

[73] Assignee: Betz Laboratories, Inc., Trevose, Pa.

[*] Notice: The portion of the term of this patent subsequent to Jun. 7, 2000 has been disclaimed.

[21] Appl. No.: 497,612

[22] Filed: May 24, 1983

Related U.S. Application Data

[63] Continuation-in-part of Ser. No. 310,163, Oct. 9, 1981, Pat. No. 4,387,027.

[51] Int. Cl.$^3$ ............................................. C02F 5/12
[52] U.S. Cl. ................................. 210/697; 210/698; 210/701; 252/181; 252/389 A; 422/13; 422/16; 422/17
[58] Field of Search ............................... 210/697–701; 252/180, 181, 389.2, 389.23, 389.5, 389.52, 389.53; 422/13, 15, 17, 16, 18, 19

[56] References Cited

U.S. PATENT DOCUMENTS

| | | | |
|---|---|---|---|
| 2,711,391 | 6/1955 | Kahler | 252/175 |
| 2,793,932 | 5/1957 | Kahler et al. | 422/19 |
| 2,848,299 | 8/1958 | Kahler et al. | 422/18 |
| 2,872,281 | 2/1959 | Kahler et al. | 422/19 |
| 2,900,222 | 8/1959 | Kahler et al. | 422/18 |
| 3,463,730 | 8/1969 | Booth et al. | 210/701 |
| 3,837,803 | 9/1974 | Carter et al. | 252/81 |
| 4,029,577 | 6/1977 | Godlewski et al. | 210/701 |
| 4,209,398 | 6/1980 | Ii et al. | 210/701 |
| 4,303,568 | 12/1981 | May et al. | 422/13 |
| 4,326,980 | 4/1982 | Snyder et al. | 210/701 |
| 4,387,027 | 6/1983 | May et al. | 210/697 |

*Primary Examiner*—Peter A. Hruskoci
*Attorney, Agent, or Firm*—Alexander D. Ricci; Bruce E. Peacock

[57] ABSTRACT

A method for inhibiting corrosion and controlling deposition in an iron containing aqueous medium is disclosed. The method is capable of providing for the formation of a protective passive oxide film on the metallic surfaces in contact with the aqueous medium without resulting in unacceptable iron based deposition or fouling. Surprisingly, the method does not call for the addition of an organic-phosphonic acid compound or derivative to the aqueous medium as would be normally expected due to the known iron dispersing characteristics of these type compounds. The invention comprises maintaining the pH level at 5.5 or above, assuring that a certain minimal calcium or other ion level is maintained, and adding to the system an orthophosphate compound, a water soluble acrylic acid/hydroxyalkylacrylate copolymer, and a topping agent selected from the group consisting of effective water soluble aminocarboxylic acids, lignosulfonates, citric acid, and tannic acid, and water soluble salt forms and mixtures thereof.

25 Claims, No Drawings

CONTROL OF IRON INDUCED FOULING IN WATER SYSTEMS

Cross-Reference to Related Applications

The present application is a continuation in part of Ser. No. 310,163, filed Oct. 9, 1981 now U.S. Pat. No. 4,387,027.

Background of The Invention

The treatment of industrial water systems, particularly cooling water systems, has over the past 25 years been subject to significant changes. The most prominently recognized treatment for cooling water systems came in the form of Betz Laboratories, Inc.'s Dianodic ® and Zinc-Dianodic product lines. These lines made use of the exceptional capacity of the chromate component in inducing the formation of a passive oxide film, believed to be primarily gamma-ferric oxide, on the metallic surfaces which provided protection against corrosion. The chromates, when used in conjunction with polyphosphates, zinc and in some cases orthophosphates, provided protection which until recently was basically unduplicatable with other treatments. In this regard, U.S. Pat. Nos. 2,711,391; 2,793,932; 2,848,299; 2,872,281; and 2,900,222 can be noted.

With the advent of Federal, State and Municipal environmental controls, however, chromate became suspect for its environmental impact on streams, ponds, lakes, etc., where it might be discharged. Some industries, particularly the petroleum refining, petrochemical, chemical and steel industries, because of each's awareness of the excellent passivation provided by the chromates through the formation of a passive oxide film, decided to continue to use the chromate treatments, with the attendant high capital expenditures for either chromate removal or recovery systems, or for disposing of reduced chromate obtained by the natural treatment of effluents. Other industries, on the contrary, have utilized treatments which avoided the use of chromates. Since chromates are superb corrosion inhibitors, systems such as cooling water systems, were maintained in the acid range, thereby avoiding the pH's where calcium carbonate and other salts normally form and precipitate.

With the prohibitions relative to the use of chromate, treatment programs were utilized which made use of the controlled precipitation of calcium phosphate and/or carbonate to form a protective barrier on the surface of the metallic parts (generally ferrous metals) to provide corrosion protection through cathodic action. These programs utilized orthophosphates, polyphosphates, phosphonic acid compounds and their salts. Although these programs were reasonably successful, they did not provide the protection established by the passive oxide film induced by chromate treatments. Moreover, these programs, because of the need for narrow ranges of pH control, were virtually unforgiving, i.e., if the concentration of the calcium ion, the phosphate or phosphonate were excessive for a particular pH, uncontrolled precipitation occurred, which on many occasions blocked the metal pipes which the programs were attempting to protect. Control of the operating parameters and conditions was extremely critical.

Typical of this approach is U.S. Pat. No. 4,209,398 (Ii et al). In accordance with this disclosure a polymer having an ethylenically unsaturated bond and having one or more carboxyl radicals, wherein at least a portion of the carboxyl radicals are modified, is combined with one or more compounds selected from the group consisting of inorganic phosphates, phosphonic acids, organic phosphoric acid esters and polyvalent metal salts. This treatment is then added to the water system. Specifically exemplified polymers include terpolymers such as, inter alia, a terpolymer of the sodium salt of acrylic acid/2-hydroxyethyl methacrylate/and methyl acrylate. The disclosed treatment may also comprise a chromate corrosion inhibitor.

These treatments, although the best available at the time, not only reduced heat transfer because of the deposited materials, but also negatively affected production because they impeded flow, for example, of the cooling water. Each of these factors had a direct effect on energy costs, since more energy was required to provide commensurate production to that achieved when chromate was used. One such chromate-free treatment is disclosed in U.S. Pat. No. 3,837,803 (Vogt et al).

In allowed U.S. Application Ser. No. 101,658 (May et al.), of common assignment herewith, a treatment is disclosed which successfully establishes the much desired but elusive passive oxide film (also believed to be a gamma-ferric oxide film) on ferrous-based metallic surfaces in contact with aqueous systems, particularly cooling water systems. The disclosed treatment comprises, inter alia, orthophosphate, a copolymer and an organo-phosphonate compound, the copolymer being composed primarily of acrylic moieties and hydroxylated lower alkyl acrylate moieties. This particular copolymer is disclosed in U.S. Pat. No. 4,029,577 (Godlewski et al). Previous to the development of this treatment, only chromate treatments had been effective in producing the protective oxide film.

Although the treatment disclosed in application Ser. No. 101,658 provides a major breakthrough in the art, since high levels (about 10-20 ppm) of orthophosphate are typically utilized, iron induced fouling has been observed in several field applications of the treatment in those instances where iron containing well water was used as a makeup source.

This iron poses a unique problem in that it is soluble in the well and is rapidly oxidized to an insoluble form, probably an hydroxide, in the cooling system. This hydroxide forms a very surface active precipitate which is the root of the fouling problem. This fouling is particularly severe in the presence of phosphate based cooling water treatments. The deposits in the phosphate systems contain calcium, iron and phosphate. It is not known whether the chemistry of the deposit is calcium phosphate and iron hydroxide or a complex iron/calcium/phosphate salt. Nevertheless, the inclusion of phosphate in the deposit is particularly damaging because it results in a deficiency of soluble phosphate for corrosion protection in addition to promoting fouling.

Accordingly, an object of the present invention is to provide an improvement over the treatment disclosed in the above application, for use in those particular situations in which the water system to be treated contains iron species under deposit forming conditions.

Detailed Description of The Invention

It has been surprisingly discovered that if one of the components normally used in the treatment disclosed in the aforementioned patent application is eliminated, much better protection is afforded against iron induced fouling. Specifically, the organophosphonic acid component of the above noted treatment is eliminated in accordance with the present invention. When, 1-hydroxy, ethylidene diphosphonic acid (HEDP) is removed, much better protection against iron induced fouling is realized. This result is highly unexpected since HEDP is known to be an effective dispersant for iron and since HEDP containing products have been sold, in the art, for many years for that particular purpose. Further, HEDP additions are usually beneficial to the treatment of the above-noted application, and the vast majority of the several hundred field applications of the treatment contain it. The absence of HEDP, or of any organo-phosphonic acid component, is thus to be considered one of the essential aspects of the present invention.

Accordingly, the present invention is applicable to water systems which are prone to the formation of iron containing deposits. Any water system comprising from about 0.5 to 10 or greater ppm Fe will benefit from use of the treatment herein disclosed and claimed.

For details of the basic treatment, over which the present invention provides significant improvement in iron containing systems, the entire disclosure of allowed U.S. patent application Ser. No. 101,658 is herewith incorporated by reference.

In accordance with the disclosure of the aforementioned patent application, in order to provide the important passivated film, the aqueous medium contained in or being conveyed by a metallic system is first adjusted to a pH of about 5.5 or above. The aqueous medium must also contain a certain calcium ion content. Under these conditions, when iron is present in the system in such amount that precipitation thereof is normally to be expected, an inorganic phosphate of the type listed in column 5, lines 1–34 of U.S. Pat. No. 3,837,803 is added to the desired system along with a water soluble polymer composed primarily of moieties derived from acrylic acid (or its water soluble salts) and moieties derived from an hydroxy lower alkyl acrylate. For additional protection, a water soluble polyphosphate may be added.

It has also been discovered that further improvement in the above mentioned treatment (in addition to that observed by the absence of HEDP or the like organo-phosphonic acid compound) can be realized if another chemical agent is added to the treatment. To be efficacious, this "topping" agent must be an effective iron dispersant and, in addition, must be compatible with the polymer used herein. Indeed, it is believed that the negative interaction between the HEDP compound and the polymer, in the presence of iron, accentuates the harmful iron fouling problem to which this present invention is directed.

Various classes of "topping" agents are thought suitable. Exemplary "topping" agents include (1) aminocarboxylic acid chelating agents such as nitrilotriacetic acid (NTA), ethylenediaminetetraacetic acid (EDTA), and hydroxyethylethylenediaminetriacidic acid (HEEDA); (2) lignosulfonates; (3) citrates; and (4) tannic acid. One particular low molecular weight lignosulfonate sold by Westvaco Co. under the tradename Reax 88B has proven particularly effective and its use is preferred.

Other potential "topping" agents, which by themselves are excellent iron dispersants, were found ineffective, presumably because of an incompatibility with the polymer component of the treatment. An example of one such ineffective iron dispersant is a copolymer of maleic anhydride and isobutylene.

In addition, copper corrosion inhibitors, such as the azole compounds, including the benzothiazole and benzotriazole compounds, or mixtures thereof may be added to afford additional corrosion protection in those cases wherein copper containing metallurgy is present in the system.

EXAMPLES

The invention will now be further described with reference to the following examples, which are to be regarded solely as illustrative, and not as restricting the scope of the invention.

The following tests demonstrate the beneficial effect that removal of HEDP has on the performance of the phosphate based treatment of aforementioned patent application Ser. No. 101,658, in the presence of iron, under conditions in which iron would normally precipitate.

The tests were conducted under recirculatory conditions with heat transfer. These conditions closely simulate the environment in a field cooling system. In this test system treated water is circulated by a centrifugal pump through a corrosion coupon by-pass into which corrosion coupons are inserted, and past a mild steel (AISI-1010) heat exchanger tube contained in a plexiglass block. The inside of the exchanger tube is filled with silicone oil and heated with an electric heater. The temperature of the silicone oil can be regulated. The water velocity past the corrosion coupons and heat exchanger tube can be controlled anywhere from 0 to 4.5 ft/sec.

The pH and temperature of the bulk water are automatically controlled. The treated water is prepared by chemical addition to deionized water. Provisions for continuous make-up and blowdown are made by pumping fresh treated water from supply tanks to the sump, with overflow from the sump serving as blowdown.

Corrosion rates are determined by exposing pre-cleaned and weighed metal specimens for a specified period of time, after which they are removed, cleaned and reweighed. Corrosion rates are calculated by dividing the total coupon weight loss by the number of days of exposure.

The base test water contained 750 ppm calcium as $CaCO_3$ and 650 ppm magnesium as $CaCO_3$ at pH of 7.0. To this water, 2.5 ppm $Fe^{3+}$ were added. This iron was admitted to the system in soluble form by slowly dripping, into the test water, a solution of ferric chloride ($FeCl_3$) which was held at an acid pH. Adding the iron continuously throughout the test and in soluble form from an acid solution, is very important. This precedure produces a fresh iron precipitate which closely simulates the iron that is encountered in real cooling systems which use well water make-up. In contrast, if iron is placed in cooling water and then allowed to stand in the laboratory for several days, e.g. in a make-up tank for the recirculating system, it loses its freshness and much of its aggressiveness for producing fouling.

The basic water treatment was as follows: 55.2 ppm trisodium phosphate, hydrated; 7.4 ppm tetrapotassium pyrophosphate; 3.0 ppm tolyltriazole; 2.4 ppm HEDP; and 50 ppm acrylic acid/2 hydroxypropylacrylate co-polymer (molar ratio AA:HPA=3:1, MW 6,000). The test parameters were: 120° F. bulk water temperature, 2.7 ft/second velocity past the heat exchanger tube, 1.9 ft/second velocity past the corrosion coupons, 8,000

BTU/hr./ft$^2$ heat flux across the heat exchanger tube, one system volume per day make-up (blowdown) rate, AISI 1010 corrosion coupons, AISI 1010 heat exchanger tubes, 7 day test duration.

Two tests were conducted. In the first test, the basic treatment was tested, as listed above. This listed composition is a typical example of an application of the treatment disclosed in application Ser. No. 101,658 and normally produces clean, passivated steel surfaces with no visible deposition or fouling. In the second test, the same treatment was used except that the HEDP component was removed.

Upon completion of the first test (with HEDP), both the heat exchanger tube and the corrosion coupons were covered with a yellow-tan film, indicative of unacceptable deposition. In sharp contrast, in the second test (no HEDP), both the heat exchange tube and corrosion coupons were clean with no visible deposited films being present. The coupon corrosion rates for the first test averaged 4.5 mpy whereas the second test averaged 4.1 mpy.

In order to ascertain the efficacy of the "topping agents" in accordance with the invention, another series of recirculator tests was undertaken. These tests were run under conditions identical to those reported above herein, but with the following exceptions: (1) The base test water contained 500 ppm calcium as CaCO$_3$ and 250 ppm magnesium as CaC0$_3$ at a pH of 7.0. 5.0 ppm of Fe$^{3+}$ were added to the system in the same manner as reported hereinabove. (2) The basic water treatment contained 60 ppm trisodium phosphate, hydrated; 5.2 ppm tetrapotassium pyrophosphate; 4.5 ppm tolyltriazole; 12.5 ppm acrylic acid/2 hydroxypropylacrylate copolymer (molar ratio AA:HPA=3:1 MW=6,000); and 10 ppm (actives) "topping agent".

The following results were obtained:

uses iron contaminated well water as the make-up source. During the application of this program, iron induced fouling became a serious problem. In fact, several of the heat exchangers became fouled and had to be cleaned. Recently, the same program, minus the HEDP component, was applied to the system. The results have clearly improved, with much less fouling on the heat exchangers providing visible evidence of this improvement.

Accordingly, the present invention provides a highly effective water treatment method for use in controlling and minimizing deposition and fouling in those water systems in which iron is present under conditions which would normally experience iron-based deposition or fouling problems. The present treatment also provides for the formation of the heretofore elusive passive metal oxide film on the metal surfaces in contact with the system water so as to minimize corrosion.

In treating the aqueous systems the following dosages in parts per million parts of water in said aqueous systems of the respective ingredients are desirable, with the dosages of course being based upon the severity of the corrosion problem foreseen or experienced:

orthophosphate (expressed as PO$_4^=$): 2 to 50 parts per million parts of water (ppm) and preferably 6 to 30 ppm;

polymer: 0.3 to 120 ppm and preferably 3 to 25 ppm of water;

polyphosphate (expressed as PO$_4^=$): 0.1 to 30, and preferably 3 to 10, parts per million parts of water;

topping agent: it may be desirable to use stoichiometric ratios with respect to the concentration of iron ions in the system. In many instances the molar ratio of "topping agent": iron should be maintained at about 3.6-9:1. In terms of parts per million, and based upon the amount of iron typically encountered, such stoichiomet-

Recirculator Tests - "Topping Agents"

| Run Number | Topping Agent | Corrosion Rate | Appearance of Heat-Exchanger Tube |
|---|---|---|---|
| 1. | Control | 2 mpy | — |
| 2. (Comparative) | Copolymer maleic anhydride/diisobutylene [viscosity 65-140 cps as 25% soln.] | 4.8 mpy | Slightly worse than control |
| 3. (Comparative) | Polyacrylic Acid [MW ≈ 5,000] | 4.0 | Worse than control |
| 4. (Comparative) | Amino tri (methyl phosphonate) | 2.9 | Similar to control |
| 5. (Comparative) | Polymaleic anhydride | 1.9 | Slightly worse than control |
| 6. | Disodium ethanol diglycine | 2.0 | Better than control |
| 7. | Hydroxyethylethylenediaminetriacetate | 2.1 | Much better than control |
| 8. | Lignosulfonate | 1.7 | Much better than control |
| 9. | Pentasodium diethylene triamine pentaacetate | 1.4 | Much better than control |

Due to the satisfactory appearance of the test heat-exchanger tubes and resulting minimal corrosion rates, the "topping agents" of runs 6-9 were deemed acceptable for use in accordance with the invention.

Field Test

A phosphate program as disclosed in application Ser. No. 101,658, including polymer, orthophosphate, polyphosphate, and HEDP, was applied to the cooling system of a midwestern petrochemical plant. This plant ric requirement would translate to a ppm "topping agent" addition range of about 0.4-450 ppm. The preferred range of addition is about 1.8-180 ppm "topping agent" per million parts of the aqueous system.

The preferred rate of application of this treatment to cooling water systems and the ratios of various components depends on the calcium concentration of the cooling water. The treatment is preferably applied in waters having between 15 ppm and 1,000 ppm calcium (as (CaCO$_3$). Within this range the weight ratio of calcium to orthophosphate is varied from 1:1 to 83.3:1, the weight ratio of AA/HAA (acrylic acid/hydroxyalkylacrylate) to orthophosphate is varied from 1:3 to 1.5:1.

The orthophosphate is generally obtained by direct addition. However, it is understood that the orthophosphate can also arise due to reversion of the inorganic polyphosphates, or any other appropriate source or precursor thereof.

The above dosages represent the most desirable ranges since most systems will be treatable therewith. Higher dosages are permissible when the situation demands, but of course are more costly. The effectiveness of the organo-phosphonate-free inventive treatments herein disclosed are dependent upon the aqueous medium having a pH of 5.5 and above, and preferably 6.5 to 9.5, and containing calcium ion concentrations, preferably about 15 parts per million parts of water. Below this range, it may be necessary for overall effectiveness to add metallic ions such as zinc, nickel, chromium, etc. as described in column 3, lines 4 to 24 of U.S. Pat. No. 3,837,803.

It can thus be seen that the disclosed invention carries out the objects of the invention set forth above. In accord with the patent statutes, the best mode has been set forth. However, it will be apparent to those skilled in the art that many other modifications can be made without departing from the invention herein disclosed and described, the scope of the invention being limited solely by the scope of the attached claims.

We claim:

1. A method of inhibiting corrosion and controlling deposition in an aqueous medium contained in a cooling water system of the type comprising iron species present in said medium in a deposit forming amount and under deposit forming conditions, said method being capable of providing for the formation of a protective passive oxide film on metallic surfaces in contact with said aqueous medium, said medium being further characterized by the absence of an organo-phosphonic acid compound therein, wherein said method consists essentially of:

(i) assuring that the pH of said aqueous medium is 5.5 or above;

(ii) assuring that the aqueous medium contains a calcium or other appropriate ion concentration selected from the group consisting of zinc, nickel and chromium and mixtures thereof; and (iii) adding to said aqueous medium (a) a water-soluble polymer comprising moieties derived from an acrylic acid or water-soluble salt thereof and moieties of an hydroxylated lower alkyl acrylate, wherein the moieties of the polymer have the following formulas:

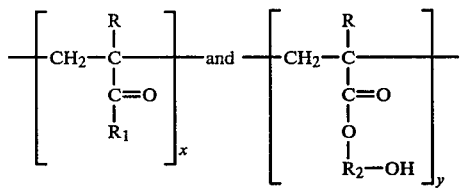

wherein R is hydrogen or a lower alkyl of from 1 to 3 carbon atoms; R$_1$ is OH, OM or NH$_2$ where M is a water-soluble cation; R$_2$ is a lower alkyl of from about 2 to 6 carbon atoms and the mole ratio of x:y is 34:1 to 1:4;

(b) a water-soluble orthophosphate compound; said polymer, together with the orthophosphate compound, being effective to promote the formation of said metal oxide film with no attendant deposition of said iron, and the amount of (a) and (b) being added being sufficient to provide a substantially scale-free protective passive oxide film on the metallic surface, and (c) from about 0.4 to 450 parts per million parts of said aqueous medium of a topping agent selected from the group consisting of effective water soluble aminocarboxylic acids, lignosulfonates, citric acid, and tannic acid, and water soluble salt forms and mixtures thereof.

2. A method according to claim 1, wherein the orthophosphate (expressed as PO$_4$=) is added to said aqueous medium in an amount of about 6 to 30 parts per million parts of water, said polymer is added in an amount of from 3 to 25 parts per million parts of water.

3. A method according to claim 2, wherein the orthophosphate (expressed as PO$_4$=) is added to said aqueous medium in an amount of about 6 to 30 parts per million parts of water, said polymer is added in an amount of from 3 to 25 parts per million parts of water, and said topping agent is added in an amount of about 1.8 to 180 parts per million parts of water.

4. A method according to claim 3, wherein the pH is maintained or adjusted within the range of 6.5 to 9.5 and said calcium ion concentration is 15 parts per million parts of water or above.

5. A method according to claim 1 further comprising adding to said aqueous medium an effective amount of a copper corrosion inhibiting compound.

6. A method according to claim 1 wherein R=hydrogen and R$_2$ is lower alkyl of 3 carbon atoms.

7. A method according to claim 1 wherein said topping agent comprises an effective water soluble aminocarboxylic acid or water soluble salt form thereof.

8. A method according to claim 1 wherein said topping agent comprises an effective lignosulfonate or water soluble salt form thereof.

9. A method according to claim 1 wherein said topping agent comprises citric acid or water soluble salt forms thereof.

10. A method according to claim 1 wherein said topping agent comprises tannic acid or water soluble salt forms thereof.

11. A method according to claim 1 wherein said water soluble aminocarboxylic acid comprises disodium ethanol diglycine.

12. A method according to claim 1 wherein said water soluble aminocarboxylic acid comprises hydroxyethylethylene-diaminetriacetate.

13. A method according to claim 1 wherein said water soluble aminocarboxylic acid comprises pentasodium diethylene-triaminepentaacetate.

14. A method of inhibiting corrosion and controlling deposition in an aqueous medium contained in a cooling water system of the type comprising iron species present in said medium in a deposit forming amount and under deposit forming conditions, said method being capable of providing for the formation of a protective passive oxide film on metallic surfaces in contact with said aqueous medium, said medium being further characterized by the absence of an organo-phosphonic acid compound therein, wherein said method consists essentially of:
(i) assuring that the pH of said aqueous medium is 5.5 or above;
(ii) assuring that the aqueous medium contains a calcium or other appropriate ion concentration selected from the group consisting of zinc, nickel and chromium and mixtures thereof; and
(iii) adding to said aqueous medium
 (a) a water-soluble polymer comprising moieties derived from an acrylic acid or water-soluble salt thereof and moieties of an hydroxylated lower alkyl acrylate, wherein the moieties of the polymer have the following formulas:

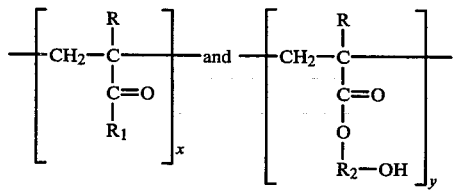

wherein R is hydrogen or a lower alkyl of from 1 to 3 carbon atoms; $R_1$ is OH, OM or $NH_2$ where M is a water-soluble cation; $R_2$ is a lower alkyl of from about 2 to 6 carbon atoms and the mole ratio of x:y is 34:1 to 1:4; and
 (b) a water-soluble orthophosphate compound; and
 (c) a water-soluble polyphosphate compound; said polymer, together with the orthophosphate compound being effective to promote the formation of said metal oxide film with no attendant deposition of said iron, and
 (d) from about 0.4 to 450 parts per million parts of said aqueous medium of a topping agent selected from the group consisting of effective water soluble aminocarboxylic acids, lignosulfonates, citric acid, and tannic acid, and water soluble salt forms and mixtures thereof, the amount of (a), (b) and (c) being added being sufficient to provide a substantially scale-free protective passive oxide film on the metallic surface.

15. A method according to claim 14, wherein the compounds and the polymer are added to the aqueous medium in the following amounts:
orthophosphate expressed as $PO_4^=$: 6 to 30 parts per million parts of water;
polymer: 3 to 25 parts per million parts of water; and
polyphosphate expressed at $PO_4^=$: 3 to 10 parts per million parts of water.

16. A method according to claim 14 wherein the pH of the aqueous medium is adjusted or maintained within the range of 6.5 to 9.5 and said calcium ion concentration in the water is 15 ppm of water or above.

17. A method according to claim 16 wherein a copper corrosion inhibitor is added to said aqueous medium in an amount of about 0.5 to about 10 parts per million parts of water.

18. A method according to claim 17 wherein R is hydrogen and $R_2$ is a lower alkyl of 3 carbon atoms.

19. A method according to claim 14 wherein said topping agent comprises an effective water soluble aminocarboxylic acid or water soluble salt form thereof.

20. A method according to claim 14 wherein said topping agent comprises an effective lingnosulfonate or water soluble salt form thereof.

21. A method according to claim 14 wherein said topping agent comprises citric acid or water soluble salt forms thereof.

22. A method according to claim 14 wherein said topping agent comprises tannic acid or water soluble forms thereof.

23. A method according to claim 14 wherein said water soluble aminocarboxylic acid comprises disodium ethanol diglycine.

24. A method according to claim 14 wherein said water soluble aminocarboxylic acid comprises hydroxyethylethylenediaminetriacetate.

25. A method according to claim 14 wherein said water soluble aminocarboxylic acid comprises pentasodium diethylenetriaminepentaacetate.

* * * * *